J. F. UNGLISH.

Vegetable Scoops.

No. 5,675. Reissued Dec. 2, 1873.

Witnesses.

H. W. Horton

H. S. Redfield

John F. Unglish

By F. N. Davis & Co.

Attorneys.

AM. PHOTO-LITHOGRAPHIC CO. N.Y. (OSBORNE'S PROCESS)

UNITED STATES PATENT OFFICE.

JOHN F. UNGLISH, OF WEBSTER, NEW YORK, ASSIGNOR OF ONE-HALF INTEREST TO JAMES E. THOMPSON, OF SAME PLACE.

IMPROVEMENT IN VEGETABLE-SCOOPS.

Specification forming part of Letters Patent No. 100,822, dated March 15, 1870; reissue No. 5,675, dated December 2, 1873; application filed November 10, 1873.

*To all whom it may concern:*

Be it known that I, JNO. F. UNGLISH, of Webster, in the county of Monroe and State of New York, have invented certain new and useful Improvements in Vegetable-Scoops; and I do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention relates to an improvement in vegetable-scoops; and it consists in making the scoop with an outer rim or bearing of a circular shape, with a stem or shank inserted in the end of the handle, in combination with cross-bars at uniform distances, and guards extending around the sides.

The accompanying drawings represent my invention.

Figure 1:
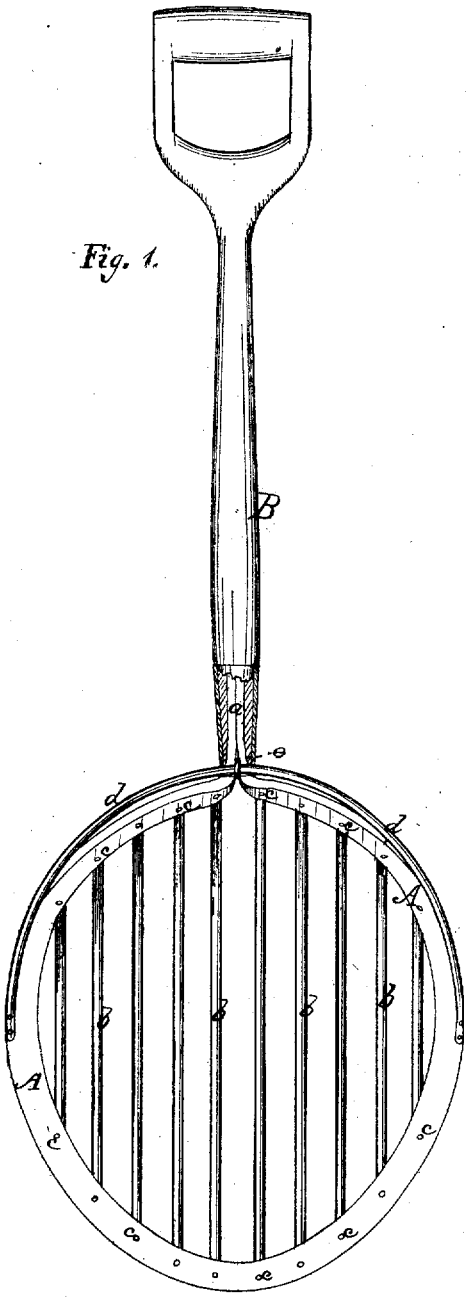
Figure 2:
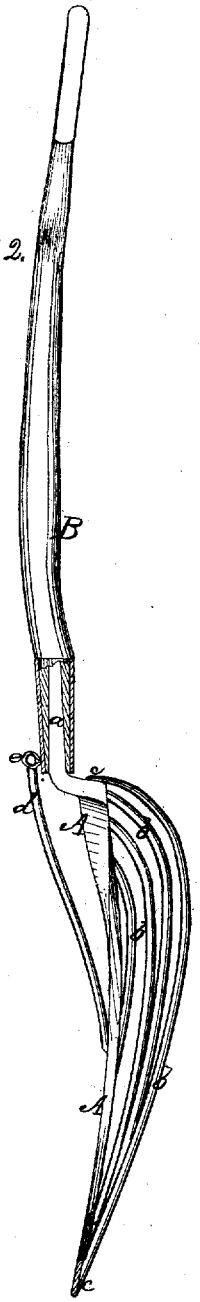

A represents the rim or bearing of the circular form, as shown in Fig. 1, furnished with a stem or shank, *a*, which is inserted in a socket in the end of the handle B. Bars or rods *b* extend across at uniform distances, as shown in the drawings, so as to allow the dirt that is scooped up with the vegetables or fruit to fall through between the bars. Guards or railings *d* extend part-way around the scoop over the rim A to prevent the contents from falling off, and allow a greater quantity to be handled at a time.

Having thus described my invention, I claim—

A vegetable-scoop consisting of the rim A, provided with the stem or shank *a*, cross-bars *b*, guards *d*, and handle D, arranged substantially as and for the purpose set forth.

In testimony that I claim the foregoing I have hereunto set my hand and seal this 20th day of October, 1873.

JOHN F. UNGLISH. [L. S.]

Witnesses:

HUGH MCKAY,

J. E. THOMPSON.